United States Patent
Isom, III et al.

(10) Patent No.: US 7,055,069 B2
(45) Date of Patent: May 30, 2006

(54) SPARE INPUT/OUTPUT BUFFER

(75) Inventors: Melvin T. Isom, III, Durham, NC (US); Shailesh U. Hegde, Cary, NC (US)

(73) Assignee: Infineon Technologies AG, Munich (DE)

( * ) Notice: Subject to any disclaimer, the term of this patent is extended or adjusted under 35 U.S.C. 154(b) by 519 days.

(21) Appl. No.: 10/226,697

(22) Filed: Aug. 23, 2002

(65) Prior Publication Data

US 2004/0039863 A1 Feb. 26, 2004

(51) Int. Cl.
G06F 11/00 (2006.01)

(52) U.S. Cl. .............................. 714/43; 714/6; 714/30; 714/42; 326/16

(58) Field of Classification Search ............... 714/30, 714/42, 6, 43; 326/16
See application file for complete search history.

(56) References Cited

U.S. PATENT DOCUMENTS

| | | | |
|---|---|---|---|
| 4,586,170 A * | 4/1986 | O'Toole et al. ............. | 365/200 |
| 5,079,455 A * | 1/1992 | McCafferty et al. ........ | 327/318 |
| 5,087,953 A * | 2/1992 | Whittaker et al. .......... | 257/203 |
| 5,299,160 A | 3/1994 | Mori | |
| 5,448,572 A * | 9/1995 | Knox et al. ................. | 370/228 |
| 5,548,555 A | 8/1996 | Lee et al. | |
| 5,841,784 A * | 11/1998 | Chan et al. ................. | 714/718 |
| 5,987,623 A | 11/1999 | Ushida | |
| 6,323,704 B1 * | 11/2001 | Pelley et al. ................ | 327/112 |

(Continued)

FOREIGN PATENT DOCUMENTS

EP 0 670 548 A1 9/1995

OTHER PUBLICATIONS

Microsoft Dictionary 4th ed., Microsoft Press, 1999, pp115 term "CPU".*

Primary Examiner—Robert Beausoliel
Assistant Examiner—Emerson Puente
(74) Attorney, Agent, or Firm—Brinks Hofer Gilson & Lione

(57) ABSTRACT

An integrated circuit ("IC") package includes an input/output ("I/O"), a spare I/O circuit, and a resident IC for processing data. The I/O circuit is coupled with a plurality of external pins, which provide external electrical connections for the communication of data and information between the resident circuitry and external circuits, such as system logic and other electronic devices to which the IC package is coupled. The I/O circuit provides a data path between the I/O pins and the resident IC. The I/O circuit may include a data buffer and voltage and current surge protection to the IC package. The resident IC includes the primary IC electronic components, such as latches, gates, and processors, configured to process the data. The spare I/O circuit provides a redundant connection between the resident IC and the external circuits. The spare I/O circuit may be provided integral to the IC package and is configured to couple a selected data I/O of the resident IC with the NC pin, and thereby bypass the I/O path provided by the I/O circuit. The spare I/O buffer may be programmed to select the I/O of the resident IC to be bypassed to the NC pin. Where the IC package includes multiple NC pins, the spare I/O buffer may provide redundant I/O path to each NC pin provided with the IC package.

12 Claims, 5 Drawing Sheets

U.S. PATENT DOCUMENTS

| | | |
|---|---|---|
| 6,396,300 B1 * | 5/2002 | Loughmiller et al. ......... 326/16 |
| 6,405,335 B1 | 6/2002 | Whetsel |
| 6,407,588 B1 | 6/2002 | Baker |
| 6,408,410 B1 | 6/2002 | Needham |
| 6,411,150 B1 | 6/2002 | Williams |
| 6,411,160 B1 | 6/2002 | Riho et al. |
| 6,411,253 B1 | 6/2002 | Cox et al. |
| 6,411,543 B1 | 6/2002 | Narui et al. |
| 6,411,647 B1 | 6/2002 | Chan |
| 6,509,632 B1 * | 1/2003 | Corisis ....................... 257/672 |
| 6,813,748 B1 * | 11/2004 | Isom et al. .................... 716/1 |
| 2002/0012263 A1 | 1/2002 | Ohshima et al. |

* cited by examiner

SPARE INPUT/OUTPUT BUFFER

BACKGROUND

1. Related Field

The present invention relates generally to semiconductor integrated circuits. In particular, the present invention relates to a redundant input/output buffer for communication of data with a semiconductor integrated circuit.

2. Description of the Related Art

Integrated circuits ("IC's") are commonly encased in an IC package, commonly referred to as an IC chip. The IC package has multiple external pins, or leads, that are made of a conductive material and provide an electrical connection for the IC resident within the IC package to external circuits. Each pin is coupled with various input, output, or input/output nodes of the IC. Common connections to the IC package include data input, output and/or input/output pins ("I/O pins"), a voltage supply terminal ($V_{SS}$) and a ground terminal. The size, orientation, and arrangement of the pins may conform to conventional standards for the type of IC, or other conventional IC package standards.

The IC package may enclose various types of IC's. The IC package may include a resident, or main, IC as well as input, output, and/or input/output circuits ("I/O circuits"), such as a data buffer circuit, current surge and electrostatic discharge (ESD) protection. The resident IC may be a processor, a memory circuit, logic gates, latches, resistive or capacitive elements, or any combination of known electronic components commonly fabricated using known fabrication techniques. The resident IC is connected to the external pins through the I/O circuits. Data can be communicated with the IC via an electrical connection to the external pins and the I/O circuits.

A failure in the I/O circuits may occur, for example, when an electrostatic discharge (ESD) may be inadvertently applied to the external circuit to which the IC is connected. When the I/O circuit fails, the data that are to be communicated via the failed I/O circuit may not be capable of being communicated with the resident IC, and therefore, the IC may not function properly. When an ESD failure, or other electrical failure occurs, the result is often a malfunctioning or non-functioning device in which the IC is operative. The failure often requires replacement of the entire IC package to restore proper operation of the device. Replacement of IC packages such as memory devices and processors is often expensive and may be cost prohibitive. The resident IC may remain functional, but because the I/O circuit of the IC package is not separable from the IC package, the entire package may need to be replaced.

Accordingly, there is a need in the art to provide a spare input/output buffer circuit for an IC environment.

BRIEF SUMMARY

The above problems have been solved with the present invention. By way of introduction only, an advantage is achieved by providing a spare input/output ("I/O") buffer circuit for an integrated circuit ("IC"). By providing a spare I/O buffer circuit, a redundant path for communication of data with the IC is provided.

Another advantage is to provide a redundant path to each input, output, and input/output (I/O) path of an IC. The redundant path provides a spare data buffer, protection circuit, pad, and external connection for the IC via a pin. Any input, output, or input/output (I/O) path may be redirected to the redundant path in the event of a failure of the input, output, or input/output (I/O) path, thereby eliminating the need to replace the entire IC in case of a failure in the circuitry comprising the input, output, or input/output (I/O) path.

It is another advantage to detect a failure of a data path of an IC and to redirect the data path to a spare I/O path provided by the IC package in which the IC is encased.

These and other advantages of the present invention are achieved by providing a spare input/output buffer circuit for integrated circuit packages. IC packages commonly include pins which are not connected to any internal circuits within the IC package and which therefore may be used to provide redundant input, output, or I/O path. Such terminals are referred to a "No Connect" ("NC") pins. The NC pins are typically provided with the IC package to conform the IC package to a conventional IC package size and orientation. Accordingly, I/O redundancy may be provided for each NC pin where an IC package includes multiple NC pins.

An advantage may be achieved by an IC package having multiple input, output, and/or input/output pins ("I/O pins"), at least one no-connect ("NC") pin, a resident IC, an I/O circuit; and a spare I/O buffer circuit. The I/O pins provide an external electrical connection for the components of the IC internal to the IC package. Conventional IC packages may have a selected number of pins which are arranged in a predetermined order. When the total number of pins of the IC package exceeds the number used by the resident IC, the remaining pins are referred to as NC pins. The NC pin may be provided as part of the IC package in order to conform the IC package to conventional IC package standards.

The resident IC may include electronic logic components such as latches, gates, memory, and processors configured to process and/or store data. The resident IC may include multiple input, output, and/or input/output nodes ("I/O nodes") through which the resident IC communicates data. Each I/O node is associated with a corresponding I/O pin.

The I/O circuit is configured to couple the I/O pins with the resident IC and may include multiple data paths between the I/O pins and the resident IC. Each data path is associated with an I/O node of the resident IC and provides an electrical connection for the transmission of data from an external circuit to the resident IC.

The spare I/O buffer circuit is configured to provide a redundant data path to the resident IC. The spare I/O buffer circuit may include a pin selection circuit which is configured to generate a signal associated with a data path of the I/O circuit that is to be replaced. The data path may need to be replaced due to, for example, an inadvertent ESD on one of the components that make up the data path.

The spare I/O buffer circuit may also include a path converter circuit that is configured to couple an I/O node of the resident IC with the NC pin in response to the pin selection signal. For each I/O node of the resident IC, the path converter circuit may include an associated multiplexer circuit that is coupled with an associated data path of the I/O circuit. The multiplexer includes an output that is coupled with the associated I/O node of the resident IC. The multiplexer couples either the data path of the I/O circuit or the spare data path to the I/O node of the resident IC in response to the pin selection signal. The multiplexer may thereby couple the I/O node to the NC pin or the corresponding I/O pin.

The I/O circuit may include circuits for voltage and current surge protection and data buffering. The pin selection circuit may include a memory circuit and a demultiplexer circuit coupled with the memory. The memory circuit is configured to store the address of a data path of the I/O circuit that is to be replaced. The demultiplexer reads the address from the memory circuit and provides the pin selection signal to the multiplexer circuit associated with the data path to be replaced.

An embodiment for a method for transmitting data between an IC and an external circuit includes the steps of providing an I/O path between the external circuit and IC; providing a spare I/O path having an electrical connection to the external circuit; detecting a fault in the I/O path; generating an I/O path replacement signal; and coupling the spare I/O path to the IC in response to the I/O pin replacement signal. The step of detecting a fault in the I/O path may be performed with diagnostic equipment external to circuit or by circuitry employed as part of the on board IC.

The foregoing summary is provided only by way of introduction. The advantages of the present invention may be realized and obtained by means of the instrumentalities and combinations particularly pointed out in the claims. Nothing in this section should be taken as a limitation on the claims, which define the scope of the invention. Additional advantages of the present invention will be set forth in the description that follows, and in part will be obvious from the description, or may be learned by practice of the present invention.

DESCRIPTION OF THE PREFERRED EMBODIMENTS

In each of the following figures, components, features and integral parts that correspond to one another each have the same reference. The drawings of the figures are not true to scale. Herein, the term "I/O" corresponds to input-only components, output-only components, and input/output components. The phrase "coupled with" and "coupled to" are defined to mean directly connected to or indirectly connected through one or more intermediate components. Such intermediate components may include both hardware and software based components.

Figure 1:
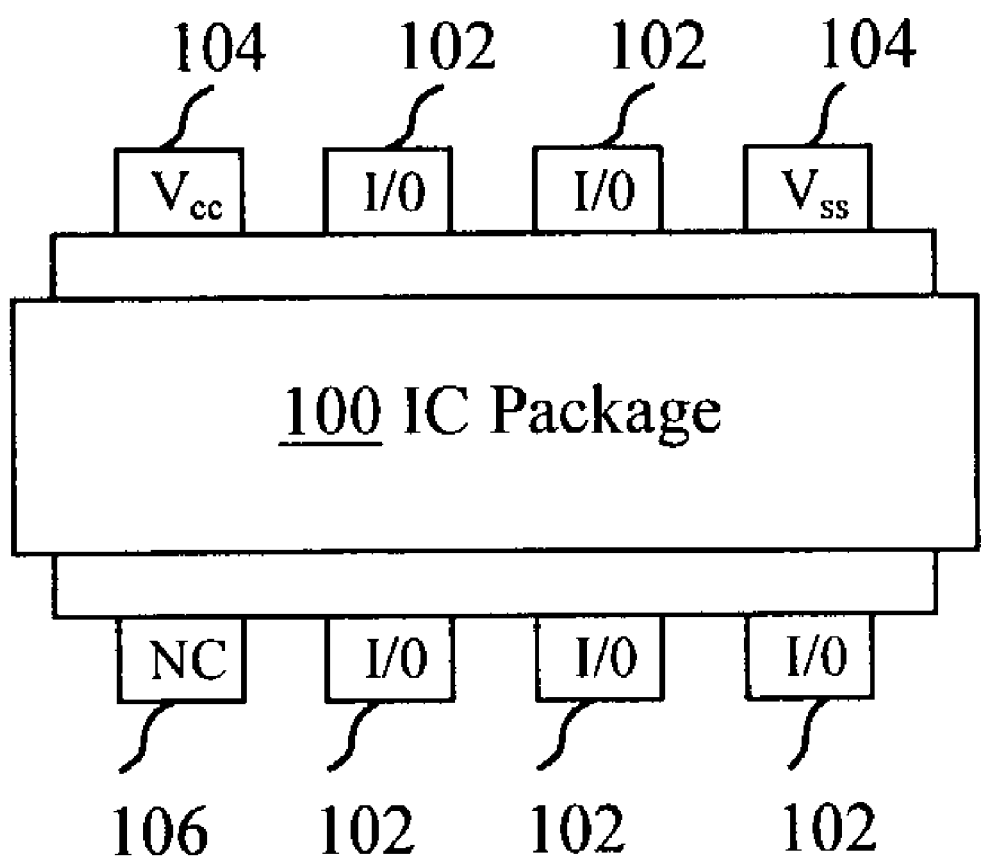
FIG. 1 is a block diagram of an integrated circuit ("IC") package.

FIG. 1 illustrates a conventional integrated circuit ("IC") package 100 used for enclosing an IC. The IC package 100 may take the form and arrangement of a conventional IC package particular to the class of IC enclosed within the IC package 100. For example, one type of packaging, commonly referred to as Dual-In-Line Packages ("DIP"), typically provides two parallel rows of pins, or leads, on opposite sides of the IC package 100. The shape and size of the IC package 100 may conform to a known standard, such as a JEDEC outline MS-001, MS-011, and MO-016, and may be available in 8, 14, 16, 18, 20, 22, 24, 28, 40, 48, and 64-lead configurations.

The IC package 100 includes input, output and/or input/output pins ("I/O pins"), or leads, 102 and voltage supply pins 104. The IC package may also include no-connect ("NC") pins 106. The I/O pins 102 are configured to provide an electrical connection for the communication of digital data and/or analog signals with the resident IC encased within the IC package 100. The voltage supply pins 104 are used to provide an electrical connection for a power supply for the IC. When the resident IC is configured such that it does not employ each of the I/O pins 102 provided with the IC package 100, any remaining pins are referred to as no-connect ("NC") pins 106 because the NC pins 106 do not have a connection to the IC within the IC package 100. The NC pins 106 may be provided to conform the IC package 100 to a conventional size, shape and arrangement, thereby providing for installation with conventional IC package carriers (not shown).

Each I/O pin 102 provides a communication connection for discrete bits of data, or logical information, and/or analog signals. The IC package 100 typically includes at least one I/O pin 102 for each bit of data, or signal, that is to be communicated with the resident IC. By way of example, an IC package 100 may include an IC having four logical "AND" gates, each "AND" gate having two input nodes and one output node. The IC package 100 will include twelve I/O pins 102; one for each input node and one for each output node. The IC package 100 will also include at least two voltage supply pins 104. Therefore, such an IC package 100 will include at least fourteen pins. If the IC package 100 is configured in a conventional sixteen pin DIN configuration, at least two leads will be NC pins 106.

Figure 2:
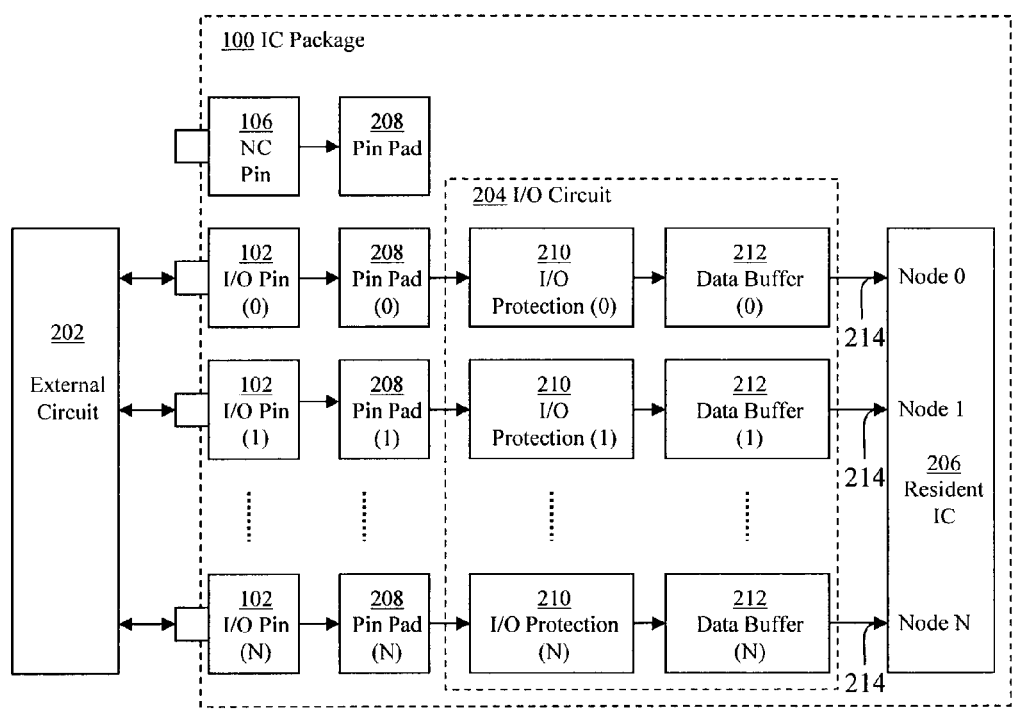
FIG. 2 is a schematic diagram showing a conventional IC package.

Referring now to FIG. 2, a conventional IC package 100 coupled with an external circuit 202 is shown. The IC package 100 includes I/O pins 102, an I/O circuit 204, and a resident IC 206. The IC package 100 may also include one or more NC pins 106. The resident IC 206 may include a memory array, logic circuits, such as gates and latches, a processor, an op-amp, or any combination of electronic components capable of being fabricated using common semiconductor IC techniques. The external circuitry 202 may include system logic that is coupled to the IC package 100 via a bus (not shown) or other common data transmission network.

The I/O pins 102 are typically a conductive material such as a metal. A portion of the I/O pins 102 is encased within the IC package 100. An external portion of the I/O pins 102 may provide for electrical connection for communication of data with the resident IC 206. The I/O pins 102 are typically configured to provide a lead for soldering to a trace on a printed circuit board (not shown) or to be loaded in an IC chip carrier (not shown).

The internal portion of the I/O pins 102 may be coupled with a pin pad 208. The I/O circuit 204 may be coupled with the I/O pins 102 via an electrical connection provided at the pin pads 208. The pin pads 208 provide a termination point for the I/O pins 102 within the IC package 100 and an electrical connection to the I/O circuit 204. Each I/O pin 102 may be coupled to an associated pin pad 208. A thin fine conductive lead, such as a wire or metallic fiber, may be connected to from the Pin pad 208 to the I/O circuit 204.

The I/O circuit 204 is coupled between the I/O pins 102 and the resident IC 206 and is configured to provide a data path between the external circuit 202 and the resident IC 206. For each I/O node 214 of the resident IC 206, the I/O circuit 204 provides a data path to an associated I/O pin 102. For example, in a resident IC 206 having N I/O nodes 214 (where N is the number of I/O nodes), the Nth I/O node 214 will be coupled to the Nth I/O pin 102 via an associated Nth data path formed by the Nth pin pad 208, the Nth I/O protection circuit 210, and the Nth data buffer 212. The I/O circuit 204 may additionally provide surge protection and data buffering for the transmission of data between the external circuit 202 and the resident IC 206. The I/O circuit may include an I/O protection circuit 210 and a data buffer circuit 212.

For each data path, an associated I/O protection circuit 210 may be coupled with an associated I/O pin 102. The I/O protection circuit 210 may be configured to clamp voltage spikes and current surges at the I/O pin 102. A voltage spike may occur, for example, due to an inadvertent electrostatic discharge ("ESD") applied to the external circuit 202. A current surge may occur at the associated I/O pin 102 due to, for example, a failure of one of the components of the external circuit 202. The I/O circuit 204 includes components configured to prevent the voltage spike and current surge from affecting a failure of the resident IC 206. The components of the I/O protection circuit 210 may protect the resident IC 206 for a single occurrence of a voltage spike or current surge. Such a voltage spike or current surge may result in an open circuit in the associated I/O protection circuit 210 and therefore an inoperable data path between the associated I/O pin 102 and the associated I/O node 214 of the resident IC 206.

For each data path, an associated data buffer 212 may be coupled with the I/O protection circuit 210. The data buffer 212 may include latches configured to provide temporary storage for a bit of data to be transferred from the associated I/O pin 102 to the associated I/O node 214.

The NC pin 106 may have an internal termination at a pin pad 208. The NC pin 106, however, is typically not coupled with any internal circuits, such as the I/O circuit 204 or the resident IC 206.

Figure 3:
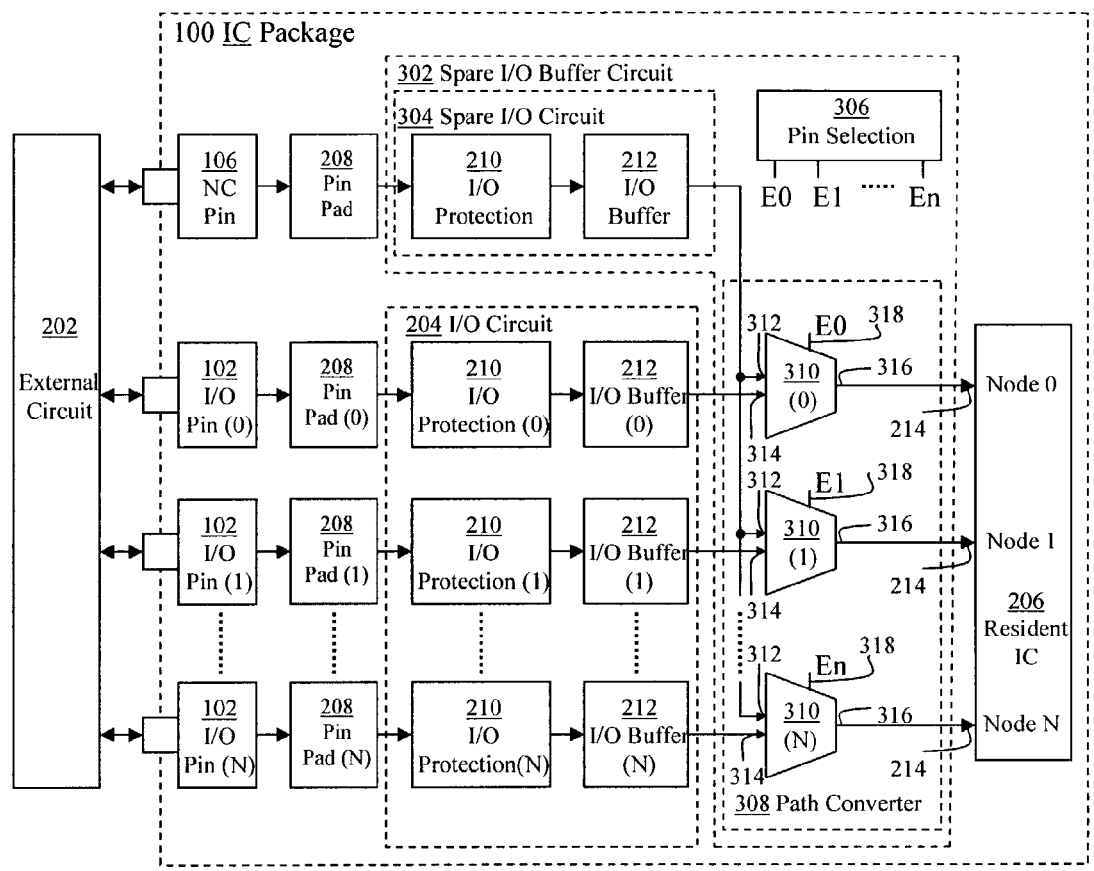
FIG. 3 is a schematic diagram showing a portion of an IC package having a spare I/O buffer circuit.

Referring now to FIG. 3, an IC package 100 having a spare I/O buffer circuit 302 is shown. The IC package 100 includes the plurality of I/O pins 102, at least one NC pin 106, pin pads 208, the I/O circuit 204, and the resident IC 206 as described with reference to FIG. 2 above.

The spare I/O buffer circuit 302 is coupled to the NC pin 106 and each data path of the I/O circuit 204. The spare I/O buffer circuit 302 includes electronic components configured to provide a redundant data path between the external circuit 202, via the NC pin 106, and the resident IC 206. The redundant data path may be used to replace a data path of the I/O circuit 204 which may have a fault or failure. By way of example, the spare I/O buffer circuit 302 may be configured to replace a data path that has an open circuit due to an ESD or a current surge on the data path. The spare I/O buffer circuit 302 may be programmed to provide a data path from the NC pin 106 to the I/O node 214 of the resident IC 206 associated with the data path having the open circuit. The spare I/O buffer 302 may also provide a redundant I/O protection and data buffering. Therefore, the spare I/O buffer circuit 302 provides an alternate means of transmission of data between the external circuit 202 and the resident IC 206.

The spare I/O buffer circuit 302 includes a spare I/O circuit 304, a pin selection circuit 306 and a path converter circuit 308. The spare I/O circuit 304 provides data buffering and protection against voltage spikes and current surges. The spare I/O circuit 304 may include an I/O protection circuit 210 coupled with the NC pin 106 via a pin pad 208 and a data buffer 212 coupled with the I/O protection circuit 210. The resident IC may communicate data with the external circuit 202 via a data path provided by the spare I/O circuit 304 to the NC pin 106.

The path converter circuit 308 is coupled with the spare I/O circuit 304 and the I/O circuit 204. The path converter circuit 308 includes electronic components configured to replace one of the data paths of the I/O circuit 204 with the data path provided by the spare I/O buffer circuit 304. The path converter 308 selects whether to couple the spare I/O circuit 304 or the data path provided by the I/O circuit 304 to an associated I/O node 214 of the resident IC 206.

In an embodiment, the path converter circuit 308 includes multiple multiplexer circuits 310. Each multiplexer circuit 310 is associated with an I/O node 214 of the resident IC 206. Each multiplexer circuit 310 includes at least a first input 312 and second input 314, an output 316, and an enable node 318. The first input 312 of the each multiplexer circuit 310 is coupled with the spare I/O circuit 304, and thereby coupled with the NC pin 106. The second input 314 is coupled with a data path of the I/O circuit 204 that corresponds to the associated I/O node 214 of the resident IC 206. The output 316 is coupled with the associated I/O node 214 of the resident IC 206. The enable node 318 is configured to receive a pin selection signal. By way of example, an Nth multiplexer 310 is associated with the Nth I/O node 214 of the resident IC 206 and has an input coupled with the Nth data path of the I/O circuit 204.

The multiplexer circuit 310 selects whether to couple the first input 312 or the second input 314 to the output 316 in response to the polarity of the pin selection signal at the enable node 318. The multiplexer circuit 310 thereby couples either the data path of the spare I/O circuit 304 or the data path of the I/O circuit 204 to the output 318 depending on the polarity of the pin selection signal at the enable node 318. Accordingly, each multiplexer circuit 310 is configured to provide a data path between the associated I/O node 214 and either the corresponding I/O pin 102 or the NC pin 106.

By way of example, when a pin selection signal En having a logical "1" is received at the enable node 318 for the Nth multiplexer circuit 310, the multiplexer circuit will couple the spare I/O circuit 304 to the output 318, thereby coupling the NC pin 106 to the associated (Nth) I/O node 214 of the resident IC 206. Similarly, when a pin selection signal having a logical "0" is received at the enable node 318, the second input 314 is coupled to the output 316, thereby coupling the corresponding data path of the I/O circuit 204 to the associated I/O node 214 of the resident IC 206. Accordingly, a logic "1" selects the NC pin 106 while a logic "0" selects the associated I/O pin 102. In another embodiment, a pin selection signal of logic "1" may select the associated I/O pin 102, while a logic "0" selects the NC pin 106.

The pin selection circuit 306 is configured to generate the pin selection signal for each of the multiplexer circuits 310. The pin selection circuit 306 includes at least N outputs, where N is the number of I/O nodes 214 of the resident IC 206. The output E0, E1, to En is coupled with the enable node 318 of the multiplexer circuit 310 associated with the I/O node 214. The pin selection circuit 306 may be programmed to store an address of a data path of the I/O circuit 204 to be replaced with the spare I/O circuit 304. The pin selection circuit may be programmed external to the IC package 100 or by components of the resident IC 206.

In an embodiment where a logic "1" represents selection of the spare I/O circuit 304, the pin selection circuit 306 generates a logic "0" on each of the outputs E0, E1, En when no data paths of the I/O circuit 204 are to be replaced. The logic "0" on each of the outputs E0, E1, En is provided to the associated enable node 318 of each multiplexer circuit 310, and the multiplexer circuit 310 thereby couples the associated data path of the I/O circuit 204 to the resident IC 206. The pin selection circuit 306 may be programmed to select replacement of an Nth data path of the I/O circuit 204 with the data path of the spare I/O circuit 304. The pin selection circuit 306 may be programmed to generate a logic "1" on the output En and generate a logic "0" on each of the other outputs E1, E2. The logic "1" on the output En is provided to the enable node 318 of the multiplexer circuit 310 associated with the Nth data path. With a logic "1" at the enable node 318, the multiplexer circuit 310 couples the first input 312, and therefore the NC Pin 106 to the corresponding Nth I/O node 214 of the resident IC 206. Therefore, the spare I/O buffer circuit 302 provides a redundant data path between the each I/O node 214 and the NC pin 106.

In an embodiment where the IC package 100 includes more than one NC pin 106, the spare I/O buffer circuit may be configured to provide a redundant data path between each I/O node 214 and each NC pin 106 of the IC circuit. Each multiplexer 310 may include an input for each of the plurality of NC pins 106 and an input for the associated data path of the I/O circuit 204. Each NC pin 106 is coupled to an associated spare I/O circuit 304 and each associated spare I/O circuit is coupled to a corresponding input of each multiplexer circuit 310. Accordingly, each NC pin 106 may be coupled to a corresponding input of each multiplexer 310 via an associated spare I/O circuit 304. The pin selection circuit 306 may be configured to selectively couple either the data path of the I/O circuit 304 or one of the NC pins 106 with the I/O node 214. By way of example, when it is desired to couple the Nth data path of the I/O circuit 204 to the Nth I/O node 214, the pin selection circuit 306 is programmed to provide a pin selection signal associated with the N data path to the Nth multiplexer circuit 310. When it is desired to couple a selected redundant data path of the spare I/O buffer circuit 302 to the Nth I/O node 214, the pin selection circuit 306 is programmed to provide a pin selection signal corresponding to the selected redundant data path to the Nth multiplexer 310, and the NC pin 106 associated with the selected redundant data path is coupled with the Nth I/O node 214.

Figure 4:
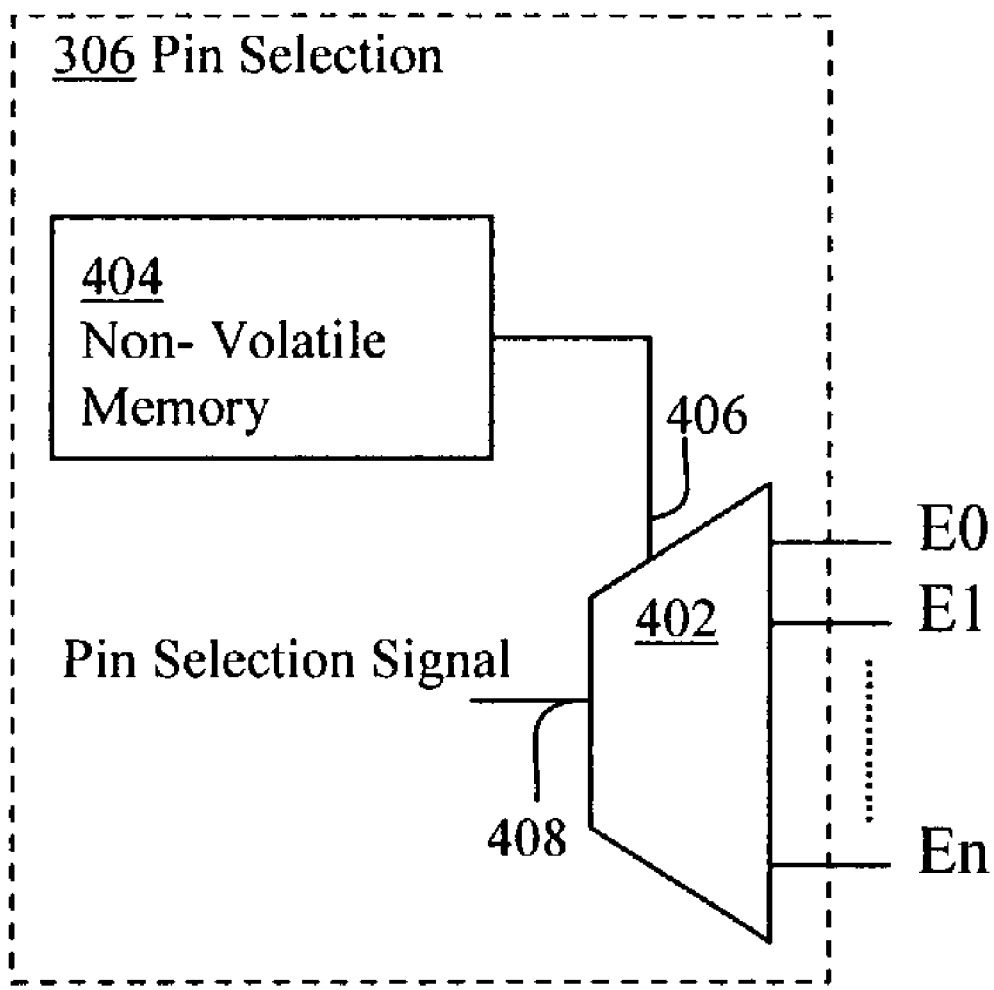
FIG. 4 is a diagram of an embodiment of a pin selection circuit.

Referring now to FIG. 4, an embodiment of the pin selection circuit 306 is shown. The pin selection circuit 306 may include a non-volatile memory 404 coupled with a demultiplexer circuit 402. The non-volatile memory 404 may be programmed to store an address for a data path of the I/O circuit 204 that is to be replaced. The demultiplexer circuit includes an input 408, multiple outputs E0, E1, En, and at least one output select node 406. The demultiplexer circuit 402 includes at least one output E0, E1, En for each multiplexer circuit 310 of the path converter circuit 308. Those skilled in the art will recognize the demultiplexer 402 may include multiple output nodes 406. The pin selection signal is provided at the input 408. The address stored by the non-volatile memory 404 is provided to the demultiplexer circuit 402 via output select node 406. The demultiplexer circuit 402 reads the address provided at output select node 406, and couples the input 408 to a corresponding output E0, E1 or En. The pin selection signal is thereby provided to the enable node 318 of the corresponding multiplexer circuit 310.

Figure 5:
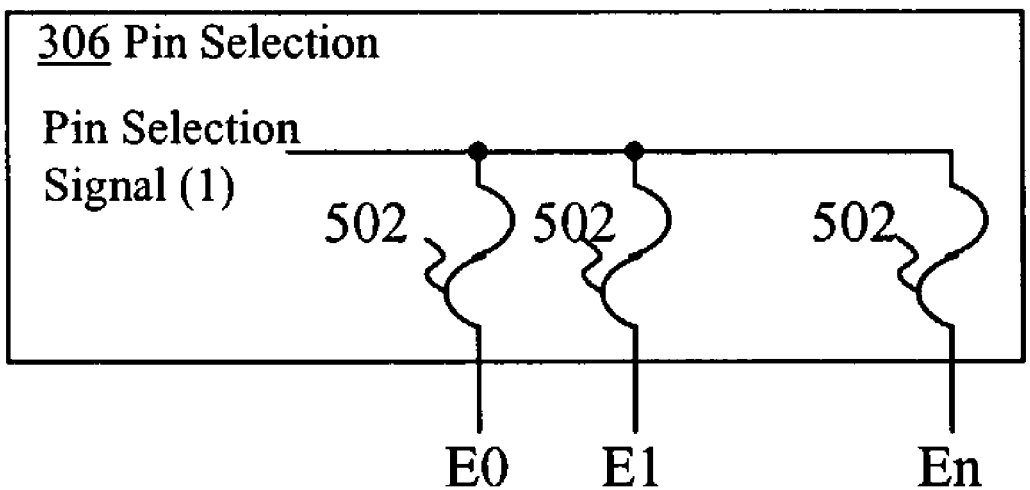
FIG. 5 is a diagram of an alternate embodiment of a pin selection circuit.

Referring now to FIG. 5, an alternate pin selection circuit 306 is shown in which each enable node 318 may be coupled to the pin selection signal via an associated electronic fuse 502. By way of example, the pin selection signal may be chosen to be a logic "1" coupled to each enable node 318. With a logic "1" provided to the enable node 318, each multiplexer may be configured to couple the data path of the I/O circuit 204 to the resident IC 206. When it is determined that a data path of the I/O circuit 204 is to be replaced with the spare I/O circuit 304, the associated electronic fuse may be opened to cause a logic "0" on the corresponding enable node 318 and the corresponding multiplexer circuit 310 will then couple the spare I/O circuit 304 and thereby the NC pin 106 to the associated I/O node 214.

Various embodiments of a spare input/output buffer circuit have been described and illustrated. However, the description and illustrations are by way of example only. Many more embodiments and implementations are possible within the scope of this invention and will be apparent to those of ordinary skill in the art and characteristics for the electrical and electronic elements described herein may be varied to implement a spare input/output buffer within the scope of this invention. For example, those skilled in the art will recognize that the present invention has applicability to any IC package having unused electrical connections. It is possible to configure single or multiple spare input/output buffers within the scope of this invention for an IC package having multiple NC pins. In addition, various electrical and electronic components may be combined or substituted to implement a spare input/output buffer within the scope of this invention. By way of example, those skilled in the art will recognize that the pin selection circuit 306 may be configured as a decoder configured to provide a pin selection signal.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

What is claimed:

1. An integrated circuit ("IC") package, comprising:
   a plurality of input/output ("I/O") pins;
   at least one no-connect ("NC") pin;
   a resident IC configured to process data;
   an I/O buffer circuit having a plurality of data paths, each data path providing a data connection between and I/O node of the resident IC and a corresponding I/O pin; and
   a spare I/O buffer circuit having:
      a pin selection circuit configured to generate a pin selection signal associated with a data path of the I/O buffer circuit, the pin selection circuit including a memory configured to store the address of a data path of the I/O circuit to be replaced, and a demultiplexer circuit coupled with the memory and configured to provide the pin selection signal to at least one of the multiplexer circuits of the I/O path converter circuit being associated with a data path to be replaced, and
      an I/O path converter circuit configured to couple an I/O node of the resident IC with the NC pin in response to the pin selection signal, the I/O path converter circuit including a multiplexer circuit associated each with data path of the I/O circuit, the multiplexer circuit having a first input coupled with the NC pin, a second input coupled with the associated data path of the I/O circuit, and an output coupled with the associated an I/O node of the resident IC, wherein the multiplexer circuit couples the NC pin to the I/O node in response to the pin selection signal.

2. The integrated circuit package of claim 1, wherein the I/O circuit comprises:
   an I/O protection circuit coupled to the I/O pins; and
   a data buffer coupled to the I/O protection circuit and configured to provide a temporary buffer for the resident IC.

3. An integrated circuit ("IC") package, comprising:
   a plurality of input/output ("I/O") pins;
   at least one no-connect ("NC") pin;
   a resident IC configured to process data;
   an I/O protection circuit coupled to the I/O pins;
   a data buffer coupled to the I/O protection circuit and configured to provide a temporary buffer for the resident IC;
   an I/O buffer circuit configured to couple the plurality of I/O pins with the resident IC, wherein the I/O buffer circuit includes a plurality of data paths, each data path providing a data connection between an I/O node of the resident IC and a corresponding I/O pin; and
   a spare I/O buffer circuit configured to selectively provide a data path between the NC pin and the resident IC, the spare I/O buffer including:
      a pin selection circuit configured to generate a pin selection signal associated with a data path of the I/O buffer circuit, the pin selection circuit including a memory configured to store the address of a data path of the I/O circuit to be replaced, and a demultiplexer circuit coupled with the memory and configured to provide the pin selection signal to at least one of the multiplexer circuits of the I/O path converter circuit being associated with a data path to be replaced, and
      an I/O path converter circuit configured to couple an I/O node of the resident IC with the NC pin in response to the pin selection signal, the I/O path converter circuit including a multiplexer circuit associated each with data path of the I/O circuit, each multiplexer circuit having a first input coupled with the NC pin, a second input coupled with the associated data path of the I/O circuit, and an output coupled with the associated an I/O node of the resident IC, wherein the multiplexer circuit couples the NC pin to the I/O node in response to the pin selection signal.

4. The integrated circuit package of claim 3, wherein the pin selection circuit comprises a plurality of electronic fuses, each electronic fuse being associated with a multiplexer of the I/O path converter circuit and configured to couple the associated multiplexer to the pin selection signal.

5. An integrated circuit ("IC") package, comprising:
   a plurality of input/output ("I/O") pins;
   at least one no-connect ("NC") pin;
   a resident IC configured to process data;
   an I/O protection circuit coupled to the I/O pins;
   a data buffer coupled to the I/O protection circuit and configured to provide a temporary buffer for the resident IC;
   an I/O buffer circuit configured to couple the plurality of I/O pins with the resident IC, wherein the I/O buffer circuit includes a plurality of data paths, each data path providing a data connection between an I/O node of the resident IC and a corresponding I/O pin; and
   a spare I/O buffer circuit configured to selectively provide a data path between the NC pin and the resident IC, the spare I/O buffer including:
      a pin selection circuit configured to generate a pin selection signal associated with a data path of the I/O buffer circuit, and includes a decoder configured to generate the pin selection, and
      an I/O path converter circuit configured to couple an I/O node of the resident IC with the NC pin in response to the pin selection signal, the I/O path converter circuit including a multiplexer circuit associated each with data path of the I/O circuit, each multiplexer circuit having a first input coupled with the NC pin, a second input coupled with the associated data path of the I/O circuit, and an output coupled with the associated an I/O node of the resident IC, wherein the multiplexer circuit couples the NC pin to the I/O node in response to the pin selection signal.

6. The integrated circuit package of claim 2, wherein the protection circuit comprises voltage surge protection.

7. The integrated circuit package of claim 2, wherein the protection circuit comprising current surge protection.

8. An integrated circuit ("IC") package, comprising:
   a plurality of pins including a plurality of input/output ("I/O") pins and at least one no-connection ("NC") pin;
   a resident IC configured to process data;
   an I/O buffer circuit having a plurality of data paths, each data path providing a data connection between at least one of the plurality of I/O pins and an associated I/O node of the resident IC; and
   a spare I/O buffer circuit having a pin selection circuit including a decoder configured to generate a pin selection signal associated with a data path of the spare I/O buffer circuit, and an I/O path converter circuit configured to couple an I/O node of the resident IC and at least one of the NC pins in response to the pin selection signal, and wherein the I/O path converter circuit includes a multiplexer circuit associated each with data path of the I/O circuit, the multiplexer circuit comprising, a first input coupled with the NC pin; a second input coupled with the associated data path of the I/O circuit; and an output coupled with the associated an I/O node of the resident IC, wherein the multiplexer circuit couples the NC pin to the I/O node in response to the pin selection signal.

9. The integrated circuit package of claim 8, wherein the pin selection circuit comprises a plurality of electronic fuses, each electronic fuse being associated with a multiplexer of the I/O path converter circuit and configured to couple the associated multiplexer to the pin selection signal.

10. The integrated circuit package of claim 8, wherein the I/O circuit comprises:
    an I/O protection circuit coupled to the I/O pins; and
    a data buffer coupled to the I/O protection circuit and configured to provide a temporary buffer for the resident IC.

11. The integrated circuit package of claim 10, wherein the I/O protection circuit comprises voltage surge protection.

12. The integrated circuit package of claim 10, wherein the I/O protection circuit comprises current surge protection.

* * * * *

UNITED STATES PATENT AND TRADEMARK OFFICE
CERTIFICATE OF CORRECTION

| | | |
|---|---|---|
| PATENT NO. | : 7,055,069 B2 | Page 1 of 1 |
| APPLICATION NO. | : 10/226697 | |
| DATED | : May 30, 2006 | |
| INVENTOR(S) | : Melvin T. Isom, III et al. | |

It is certified that error appears in the above-identified patent and that said Letters Patent is hereby corrected as shown below:

<u>In the Claims</u>

Column 10, line 3, delete "includes" and substitute --including-- in its place.

Column 10, line 20, delete "comprising" and substitute --comprises-- in its place.

Signed and Sealed this

Twenty-fifth Day of December, 2007

JON W. DUDAS
*Director of the United States Patent and Trademark Office*